United States Patent
Furuhashi et al.

(10) Patent No.: US 11,161,710 B2
(45) Date of Patent: Nov. 2, 2021

(54) SHEET SEPARATION DEVICE, LAMINATOR, IMAGE FORMING APPARATUS, AND IMAGE FORMING SYSTEM

(71) Applicants: Tomohiro Furuhashi, Kanagawa (JP); Akihiro Iwasaki, Kanagawa (JP); Michitaka Suzuki, Kanagawa (JP); Fumiharu Yoneyama, Kanagawa (JP); Tomomichi Hoshino, Kanagawa (JP); Wataru Takahashi, Tokyo (JP); Takuya Morinaga, Tokyo (JP); Koki Sakano, Kanagawa (JP); Akira Kunieda, Tokyo (JP); Yohsuke Haraguchi, Kanagawa (JP); Makoto Hidaka, Tokyo (JP)

(72) Inventors: Tomohiro Furuhashi, Kanagawa (JP); Akihiro Iwasaki, Kanagawa (JP); Michitaka Suzuki, Kanagawa (JP); Fumiharu Yoneyama, Kanagawa (JP); Tomomichi Hoshino, Kanagawa (JP); Wataru Takahashi, Tokyo (JP); Takuya Morinaga, Tokyo (JP); Koki Sakano, Kanagawa (JP); Akira Kunieda, Tokyo (JP); Yohsuke Haraguchi, Kanagawa (JP); Makoto Hidaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 24 days.

(21) Appl. No.: 16/747,225

(22) Filed: Jan. 20, 2020

(65) Prior Publication Data
US 2020/0247636 A1    Aug. 6, 2020

(30) Foreign Application Priority Data
Jan. 31, 2019 (JP) .............................. JP2019-015454

(51) Int. Cl.
*B32B 37/18* (2006.01)
*B65H 29/12* (2006.01)
(Continued)

(52) U.S. Cl.
CPC ............. *B65H 29/125* (2013.01); *B65H 3/06* (2013.01); *B65H 3/36* (2013.01); *B65H 45/04* (2013.01); *B65H 45/16* (2013.01); *B65H 5/06* (2013.01)

(58) Field of Classification Search
None
See application file for complete search history.

(56) References Cited

U.S. PATENT DOCUMENTS 5,217,561 A * 6/1993 Ueda ..................... B32B 37/226
                                                          156/359
6,159,327 A * 12/2000 Forkert ................. B26D 1/305
                                                          156/256
(Continued)

FOREIGN PATENT DOCUMENTS

GB        2473888 A      3/2011
JP     H09150456 A       6/1997
(Continued)

OTHER PUBLICATIONS

Extended European Search Report dated Jun. 25, 2020, issued in corresponding European Patent Application No. 20150105.3.

*Primary Examiner* — Leslie A Nicholson, III
(74) *Attorney, Agent, or Firm* — Harness, Dickey & Pierce, P.L.C

(57) ABSTRACT

A sheet separation device to open a two-ply sheet includes a rotator; a nipping member disposed opposite the rotator and configured to nip the two-ply sheet with the rotator; a conveyor configured to convey the two-ply sheet between the rotator and the nipping member, and a winding member disposed adjacent to the rotator. The conveyor conveys the (Continued)

two-ply sheet with a bonded portion of the two-ply sheet being an upstream end or a downstream end of the two-ply sheet in a conveyance direction of the two-ply sheet. The winding member winds the two-ply sheet around the rotator, to create a difference in winding circumferential length between the two sheets and separate the two sheets.

19 Claims, 17 Drawing Sheets

(51) Int. Cl.
    *B65H 45/04*     (2006.01)
    *B65H 45/16*     (2006.01)
    *B65H 3/06*     (2006.01)
    *B65H 3/36*     (2006.01)
    *B65H 5/06*     (2006.01)

(56) References Cited

U.S. PATENT DOCUMENTS

| | | | |
|---|---|---|---|
| 7,946,326 B2 * | 5/2011 | Lee | B32B 41/00 |
| | | | 156/367 |
| 2005/0079968 A1 | 4/2005 | Trovinger | |
| 2017/0021603 A1 * | 1/2017 | Kikuchi | B32B 37/182 |
| 2017/0341885 A1 | 11/2017 | Suzuki et al. | |
| 2018/0259895 A1 | 9/2018 | Shibasaki et al. | |
| 2019/0284012 A1 | 9/2019 | Yoneyama et al. | |

FOREIGN PATENT DOCUMENTS

| | | |
|---|---|---|
| JP | 10-013607 | 1/1998 |
| JP | 2006-160429 | 6/2006 |

* cited by examiner

SHEET SEPARATION DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2019-015454, filed on Jan. 31, 2019, in the Japan Patent Office, the entire disclosure of which is hereby incorporated by reference herein.

BACKGROUND

Technical Field

This disclosure relates to a sheet separation device, a laminator, an image forming apparatus, and an image forming system.

Related Art

There is known a lamination technique of inserting an insertion sheet (paper, photo, etc.) between a two-ply laminate sheet or laminate film (e.g., a lamination pouch or lamination folder) in which two sheets are bound (sealed) on one side as if one sheet is folded. The two-ply laminate sheet is bonded, with the insertion sheet sandwiched therebetween, with heat and pressure.

In a conventional laminating process, a user manually inserts the insertion sheet in the two-ply sheet and then bonds the laminate sheet using a lamination machine (hereinafter simply "laminator").

However, there is an adhesive layer on the inside of the two-ply laminate sheet that resist separation, thereby requiring that the user separate the two sides of the laminate sheet by hand. Another bother is accurately positioning the insertion sheet after the laminate sheet is opened. Further, the laminating process by the laminator takes about 30 to 60 seconds, and the user has to wait for the process to finish.

Thus, the user has to repeat, for the number of required sheets, such steps as: (1) inserting the sheet inside the laminate sheet and setting the laminate sheet in the laminator; and (2) inserting another insertion sheet inside another laminate sheet while the laminator operates. Therefore, even in the case of laminating some several tens of sheets, the user has to stay at the laminator for a long time, and manpower for repeating the above operation is required.

SUMMARY

An embodiment of this disclosure provides a sheet separation device to open a two-ply sheet. The sheet separation device includes a rotator; a nipping member disposed opposite the rotator and configured to nip the two-ply sheet with the rotator; a conveyor configured to convey the two-ply sheet between the rotator and the nipping member, and a winding member disposed adjacent to the rotator. The conveyor conveys the two-ply sheet with a bonded portion of the two-ply sheet being an upstream end or a downstream end of the two-ply sheet in a conveyance direction of the two-ply sheet. The winding member winds the two-ply sheet around the rotator, to cause a difference in winding circumferential length between the two sheets and separate the two sheets.

According to another embodiment, a sheet separation device includes a rotator that includes a holder configured to hold the two-ply sheet. The sheet separation device further includes a conveyor configured to convey the two-ply sheet to the holder, with a bonded portion of the two-ply sheet being an upstream end or a downstream end of the two-ply sheet in a conveyance direction of the two-ply sheet. The holder is configured to wind the two-ply sheet around the rotator as the rotator rotates, to create a difference in winding circumferential length between the two sheets and thus separate the two sheets.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
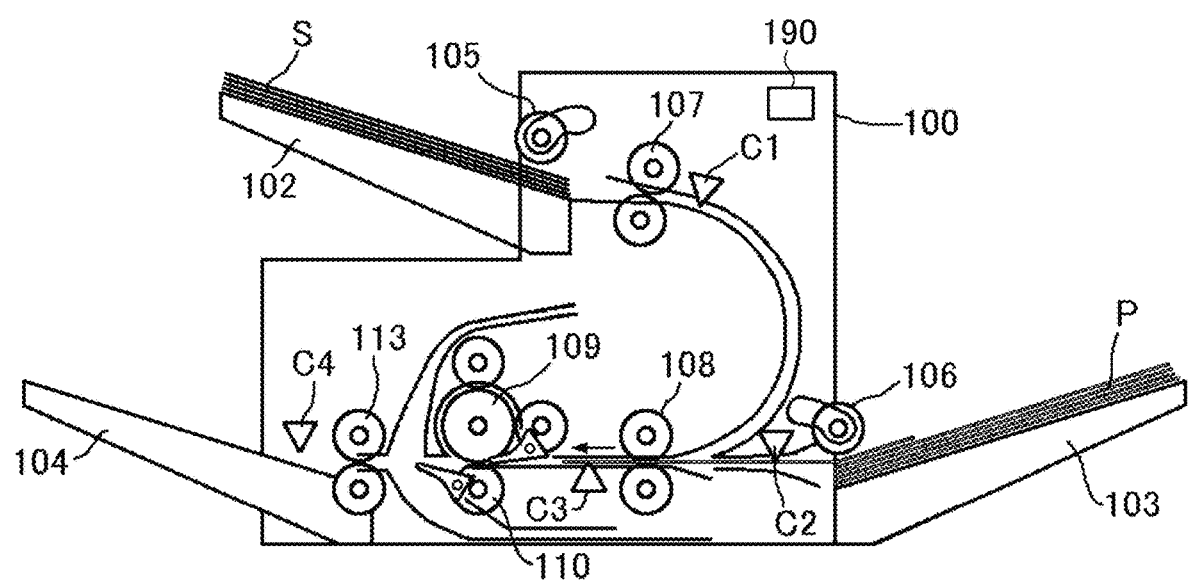
FIG. 1 is a schematic view illustrating a general arrangement of a sheet separation device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, sheet separation devices according to embodiments of this disclosure is described. As used herein, the singular forms "a", "an", and "the" are intended to include the plural forms as well, unless the context clearly indicates otherwise.

The sheet separation devices according to embodiments of this disclosure is to open a two-ply sheet (hereinafter referred to as a lamination sheet S) and to insert and sandwich an insertion sheet P in the opened two-ply sheet.

The lamination sheet S is a two-ply sheet constructed of two overlapping sheets and joined at one portion (or on one side).

For example, there is a two-ply sheet in which a first side is a transparent sheet such as a transparent polyester sheet and the opposite side is a transparent or opaque sheet and bonded to the other sheet on one side thereof.

The insertion sheet P is an example of a sheet medium that is inserted in the two-ply sheet and can be plain paper, thick paper, postcards, envelopes, thin paper, coated paper (art paper, etc.), tracing paper, overhead projector (OHP) transparencies, and the like.

In the present specification, "separating the lamination sheet S" and "opening the two-ply lamination sheet S" signify peeling one of the two-sheets of the two-ply lamination sheet S from the other.

FIG. 1 is a schematic view illustrating a general arrangement of a sheet separation device according to a first embodiment. As illustrated in FIG. 1, a sheet separation device 100 includes a sheet tray 102 that is a first stacking tray on which the lamination sheets S are stacked, a pickup roller 105 that feeds the lamination sheet S from the sheet tray 102, and a conveyance roller pair 107. The sheet separation device 100 further includes a sheet feeding tray 103 that is a second stacking tray on which the insertion sheets P are stacked, and a pickup roller 106 that feeds the insertion sheets P from the sheet feeding tray 103.

A sheet sensor C1 to detect the position of the lamination sheet S being conveyed is disposed downstream from the conveyance roller pair 107 in a conveyance direction of the lamination sheet S. A sheet sensor C2 to detect the position of the insertion sheet P being conveyed is disposed downstream from the pickup roller 106 in a conveyance direction of the insertion sheet P.

The sheet separation device 100 further includes an entrance roller pair 108, a winding roller 109 as a rotator, a driven roller 110 as a first nipping member described later, an exit roller pair 113, an output tray 104, and the like, downstream from the conveyance roller pair 107 and the pickup roller 106 in the conveyance direction of the lamination sheet S and the insertion sheet P. The winding roller 109 and the driven roller 110 are paired as a roller pair. A sheet sensor C3 to detect the position of the lamination sheet S and the insertion sheet P being conveyed is disposed downstream from the entrance roller pair 108 in the conveyance direction. A sheet sensor C4 to detect the position of the lamination sheet S being conveyed is disposed downstream from the exit roller pair 113 in the conveyance direction.

The pickup roller 105, the conveyance roller pair 107, the entrance roller pair 108, and the roller pair constructed of the winding roller 109 and the driven roller 110 are examples of a first feeder to feed a two-ply sheet. The pickup roller 106, the entrance roller pair 108, and the roller pair constructed of the winding roller 109 and the driven roller 110 are examples of a second feeder to feed a sheet medium into the two-ply sheet. The sheet separation device 100 further includes a controller 190 including a central processing unit (CPU) and the like. The controller 190 controls the operation of the sheet separation device 100 and performs a determination process and the like described later.

As illustrated in FIG. 1, in the sheet separation device 100 according to the present embodiment, the lamination sheets S and the insertion sheets P are stacked on separate trays and fed to between the roller pair constructed of the winding roller 109 and the driven roller 110 and further to the exit roller pair 113. As will be described later, in a state where the lamination sheet S is between the exit roller pair 113 and the roller pair constructed of the winding roller 109 and the driven roller 110, the insertion sheet P is inserted into the two-ply lamination sheet S being opened. Then, the exit roller pair 113 ejects and stacks the lamination sheet S, in which the insertion sheet P is inserted, onto the output tray 104. The configuration and operation thereof are described in detail below.

Figure 2:
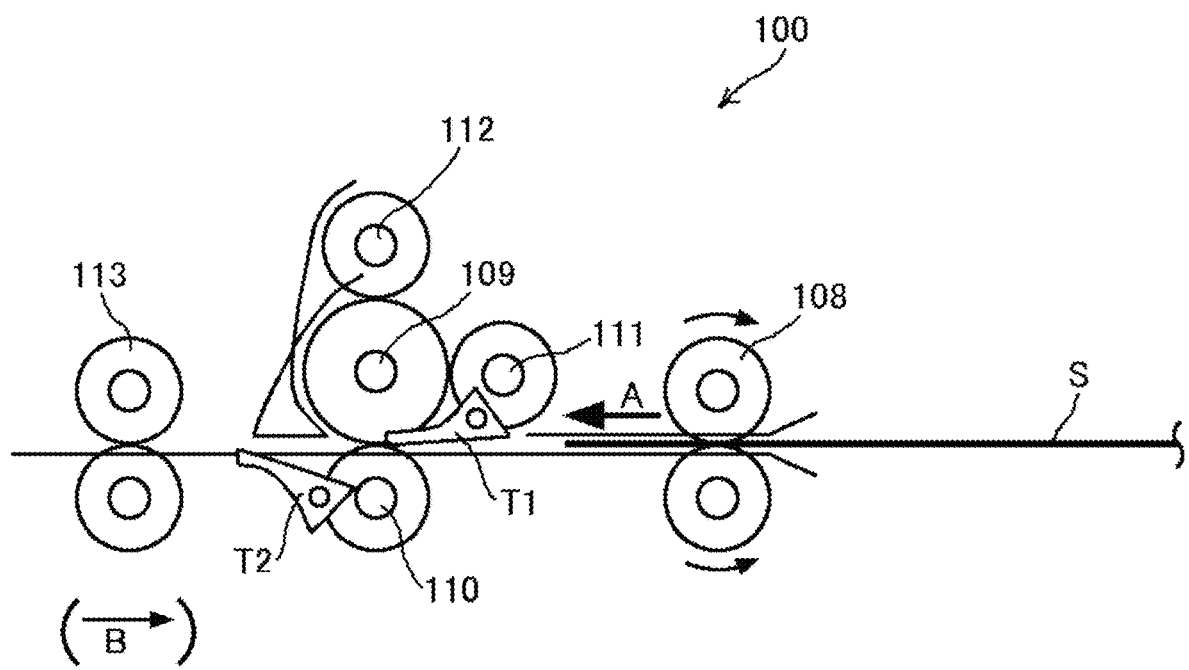
FIG. 2 is a view of a main part of the sheet separation device according to the first embodiment.

FIG. 2 is a view illustrating a main part of the sheet separation device according to the first embodiment. As illustrated in FIG. 2, the sheet separation device 100 includes the exit roller pair 113 serving as a first conveyor to convey the two-ply sheet between the rotator and the first nipping member. That is, the exit roller pair 113 conveys the lamination sheet S between the roller pair of the winding roller 109 and the driven roller 110.

Each of the entrance roller pair 108 and the exit roller pair 113 is, for example, two rollers paired with each other. Driven by a driver (a motor or the like), the entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. This conveyance direction indicated by arrow A is referred to as a forward conveyance direction (or direction A).

By contrast, the exit roller pair 113 can switch the direction of rotation between the forward direction and the reverse direction. The exit roller pair 113 can convey the nipped lamination sheet S in the forward conveyance direction toward the output tray 104 (see FIG. 1) and the reverse direction in which the lamination sheet S is retracted toward the winding roller 109. The conveyance direction toward the winding roller 109 (the direction indicated by arrow B and reverse to the forward conveyance direction) is referred to as the backward conveyance direction (or direction B).

Between the entrance roller pair 108 and the exit roller pair 113, the sheet separation device 100 further includes the winding roller 109 that is the rotator and the driven roller 110 that is the first nipping member. The driven roller 110 rotates with the winding roller 109.

Driven by a driver (motor or the like), the winding roller 109 rotates in the forward and reverse directions, and the direction of rotation can be switched between the forward direction and the reverse direction (clockwise and counterclockwise). The driven roller 110 is in contact with the winding roller 109 forming a nip therewith. The winding roller 109 and the driven roller 110 nip and convey the lamination sheet S and the insertion sheet P.

The sheet separation device 100 further includes, as second nipping members (rollers), grip rollers 111 and 112 arranged at an interval from each other and bifurcating claws T1 and T2 around the circumference (outer circumferential surface) of the winding roller 109, which is orthogonal to the rotation axis of the winding roller 109. The bifurcating claws T1 and T2 switch the conveyance direction of the lamination sheet S.

The plurality of grip rollers 111 and 112 is in contact with the winding roller 109 and rotates with the winding roller 109. The grip rollers 111 and 112, together with the winding roller 109, nip (grip) the lamination sheet S and wind the lamination sheet S around the winding roller 109.

The bifurcating claw T1 is disposed between the entrance roller pair 108 and the winding roller 109. the bifurcating claw T2 is disposed between the winding roller 109 and the exit roller pair 113. The positions (orientations) of the bifurcating claws T1 and T2 can be changed by a driver (a motor or the like), and the conveyance direction of the lamination sheet S can be changed.

The grip rollers 111 and 112 and the bifurcating claws T1 and T2 are examples of winding members to wind the lamination sheet S around the winding roller 109.

With reference to FIGS. 1 to 14, a description is given of a series of operations of the sheet separation device 100, that is, operations from separation of the lamination sheet S to insertion of the insertion sheet P. In FIGS. 3 to 14, elements identical to those illustrated in FIG. 1 or 2 are given identical reference numerals, and the descriptions thereof are omitted.

As illustrated in FIG. 1, in the sheet separation device 100 according to the present embodiment, the lamination sheets S, in each of which two sheets are bonded partly, are stacked on the sheet tray 102. The lamination sheets S are stacked with the bonded side thereof on the downstream side in the direction of feeding (conveyance direction) of the pickup roller 105. The pickup roller 105 picks up the lamination sheet S from the sheet tray 102, and the conveyance roller pair 107 conveys the lamination sheet S toward the entrance roller pair 108.

Next, as illustrated in FIG. 2, the lamination sheet S is conveyed by the entrance roller pair 108 toward the nip between the winding roller 109 and the driven roller 110. At this time, the bifurcating claws T1 and T2 are positioned above and below the conveyance passage of the lamination sheet S. The bifurcating claw T1 guides the lamination sheet S from the entrance roller pair 108 between the winding roller 109 and the driven roller 110. The bifurcating claw T2 guides the lamination sheet S from between the winding roller 109 and the driven roller 110 to the exit roller pair 113.

In the present embodiment, ends of the two sheets of the lamination sheet S are bonded together on one of the four sides, and the sheet separation device 100 conveys the lamination sheet S with the bonded side on the downstream side in the forward conveyance direction (direction A). However, the manner of conveyance is not limited thereto but can be as follows. The lamination sheets S are stacked on the sheet tray 102 such that the bonded side is on the upstream side in the direction of feeding (conveyance direction) of the pickup roller 105. The sheet S fed from the sheet tray 102 is conveyed to the exit roller pair 113 in the direction opposite to the direction of conveyance of the exit roller pair 113 toward the winding roller 109.

Figure 3:
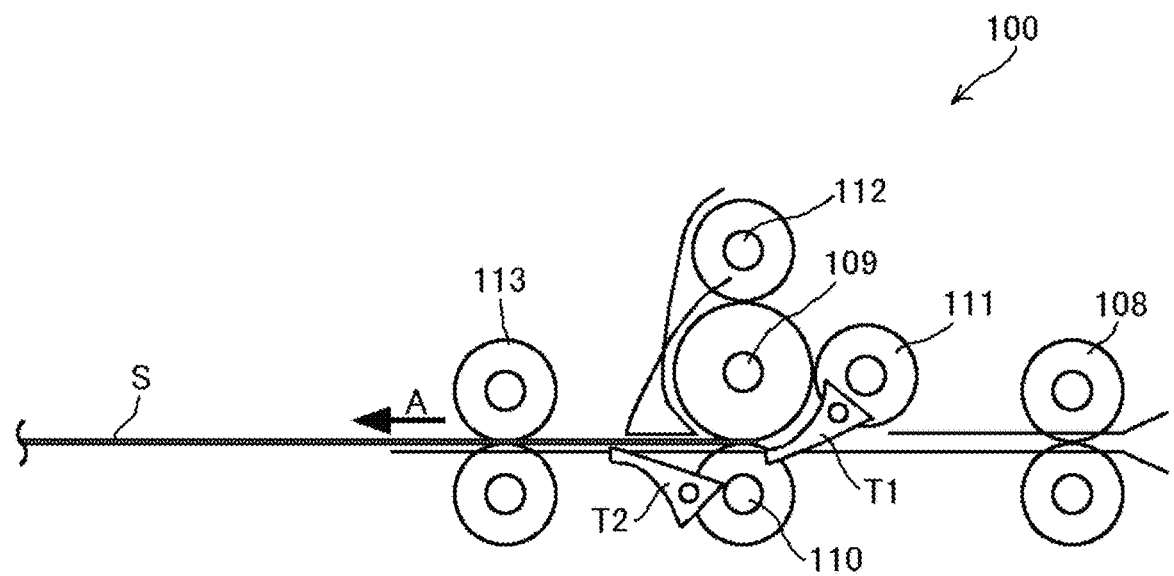
FIG. 3 is another view of the main part of the sheet separation device according to the first embodiment.

Subsequently, as illustrated in FIG. 3, the sheet separation device 100 suspends conveyance of the lamination sheet S after the rear end of the lamination sheet S in the forward conveyance direction passes the bifurcating claw T1. For example, when the rear end is nipped between the winding roller 109 and the driven roller 110, the sheet separation device 100 suspends conveyance. At the same time, the bifurcating claw T1 moves (rotates) counterclockwise in the drawing around the rotation axis as a fulcrum, to form a passage (i.e., a winding passage) to guide the rear end of the lamination sheet S around the winding roller 109. These actions can be triggered by the detection of position of the lamination sheet S by the sheet sensor C3 (see FIG. 1).

Figure 4:
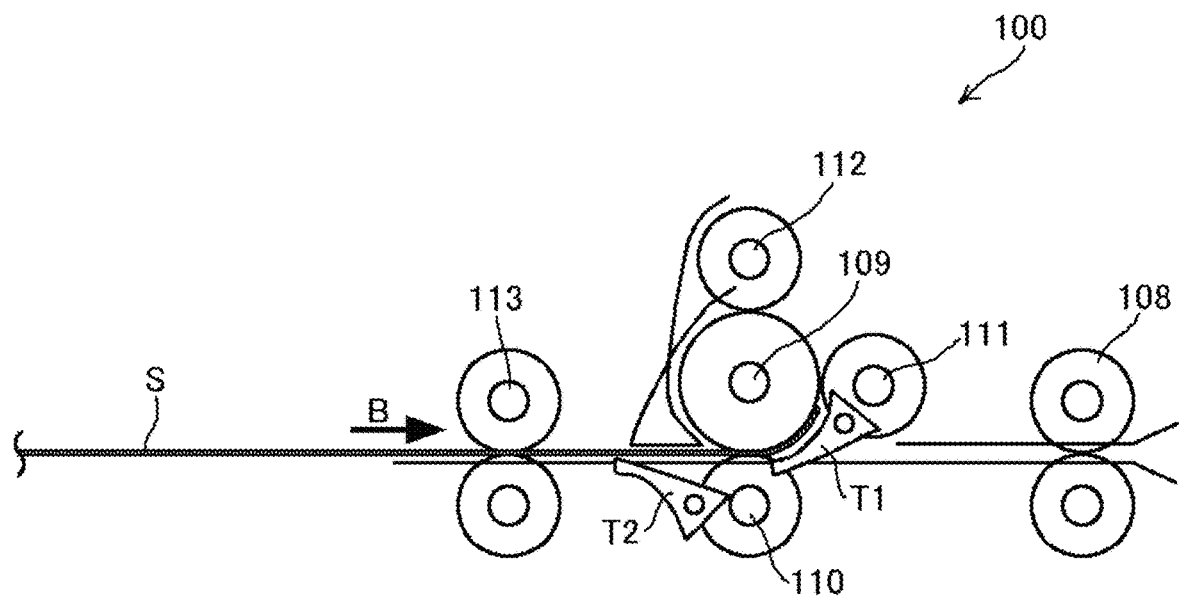
FIG. 4 is another view of the main part of the sheet separation device according to the first embodiment.

Next, as illustrated in FIG. 4, the exit roller pair 113 and the winding roller 109 reverse the rotation direction and convey the lamination sheet S in the backward conveyance direction (direction B). Then, the lamination sheet S is guided around the winding roller 109 by the bifurcating claw T1. That is, the sheet separation device 100 winds the lamination sheet S around the winding roller 109 from the side where the two sheets of the lamination sheet S are not bonded. Note that the rotation direction of the winding roller 109 at this time is referred to as a winding rotation direction.

Figure 5:
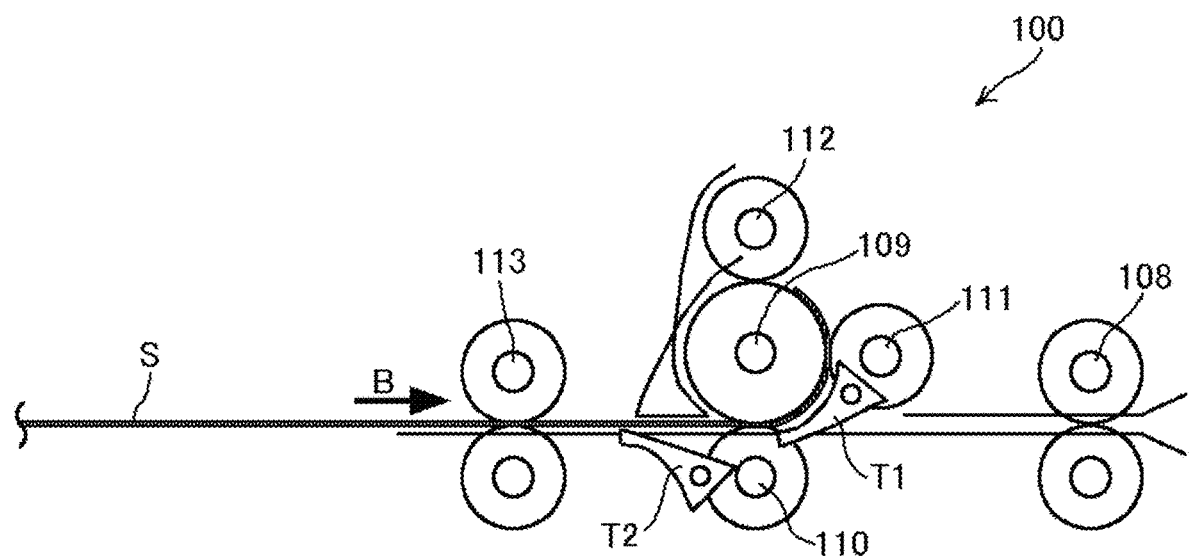
FIG. 5 is another view of the main part of the sheet separation device according to the first embodiment.
Figure 6:
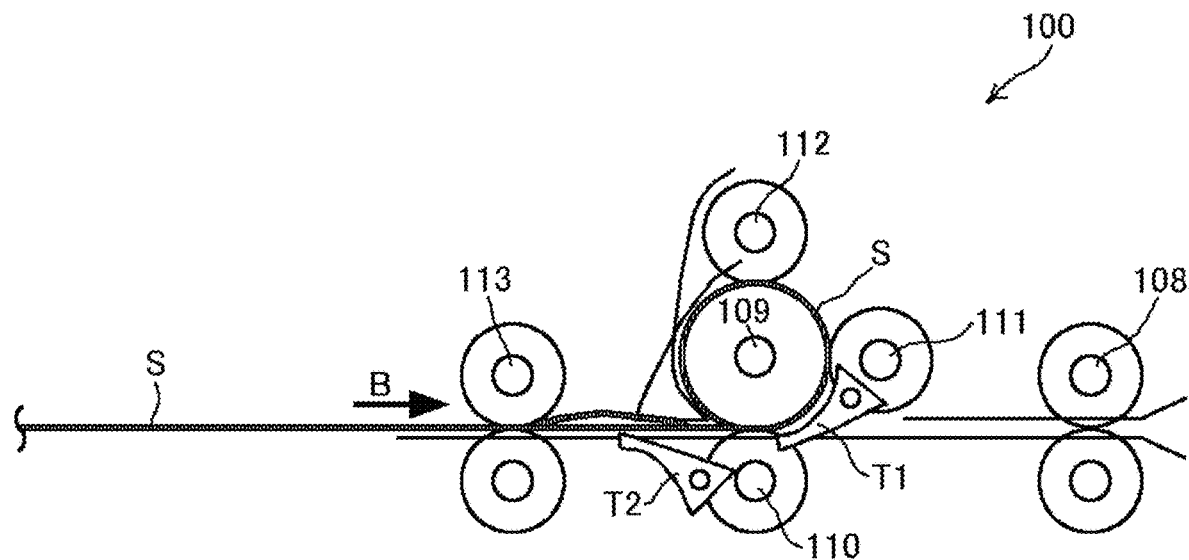
FIG. 6 is another view of the main part of the sheet separation device according to the first embodiment.
Figure 7:
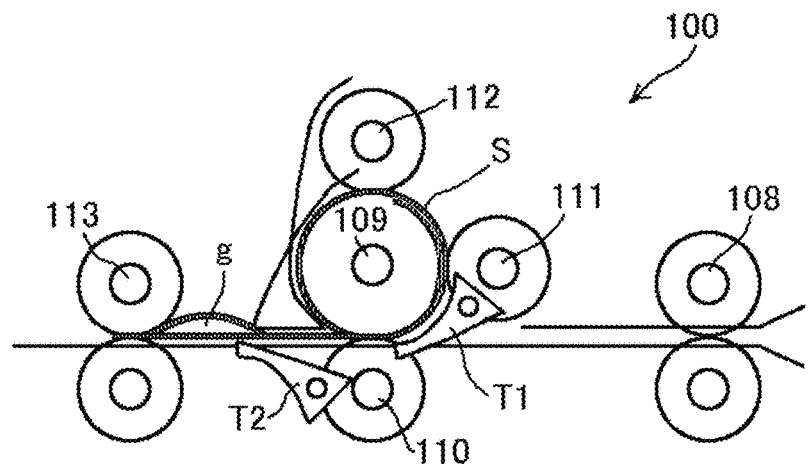
FIG. 7 is another view of the main part of the sheet separation device according to the first embodiment.

FIGS. 5 to 7 illustrate a process of winding the lamination sheet S around the winding roller 109. The grip rollers 111 and 112 nip the fed lamination sheet S with the winding roller 109 and wind the lamination sheet S around the circumference of the winding roller 109 (see FIG. 5).

When the lamination sheet S is wound around the winding roller 109 over the entire circumference or greater, the end (the unbonded side of the lamination sheet S) of the lamination sheet S is secured to the winding roller 109. As the lamination sheet S is further wound around the winding roller 109, a difference in the circumferential length (a difference in winding amount) is created between the inner peripheral side sheet of the two-ply lamination sheet S and the outer peripheral side sheet thereof. Then, between the exit roller pair 113 and the winding roller 109, the lamination sheet S begins to separate (i.e., a gap starts appearing in the lamination sheet S), as illustrated in FIG. 6.

Then, as illustrated in FIG. 7, the slack in the inner sheet gathers between the exit roller pair 113 and the winding roller 109, and a gap (space) g is created between the inner sheet and the outer sheet.

As described above, the sheet separation device 100 according to the present embodiment winds the lamination sheet S around the winding roller 109, thereby causing a difference in winding circumferential length between the inner sheet and the outer sheet from a geometrical relationship. Thus, the lamination sheet S can be reliably separated.

A description is given of configuration and operation of the sheet separation device 100 according to the present embodiment for separating the lamination sheet S entirely between the bonded side (one end) and the other side (the other end) that is an opening end opposite the bonded side and inserting the insertion sheet P therein.

Figure 8:
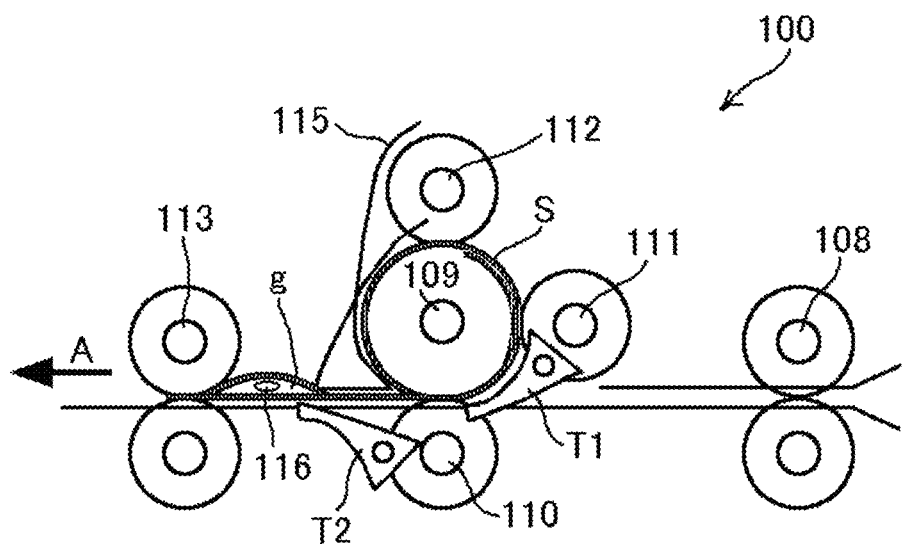
FIG. 8 is another view of the main part of the sheet separation device according to the first embodiment.

As illustrated in FIG. 8, the sheet separation device 100 according to the present embodiment further includes a sheet guide 115 and separation claws 116. The sheet guide 115 is a passage member that defines a conveyance passage and guides one of the separated sheets of the lamination sheet S. The separation claws 116 are disposed on both sides in the width direction of the lamination sheet S and movable in the width direction. The sheet separation device 100 can insert the separation claws 116 into the gap g generated in the lamination sheet S from both sides in the width direction.

Figure 9:
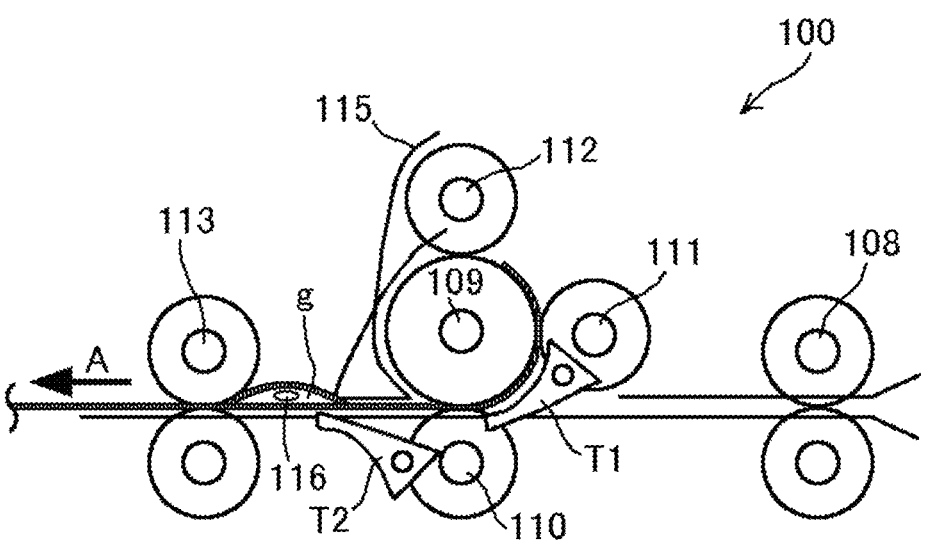
FIG. 9 is another view of the main part of the sheet separation device according to the first embodiment.
Figure 10:
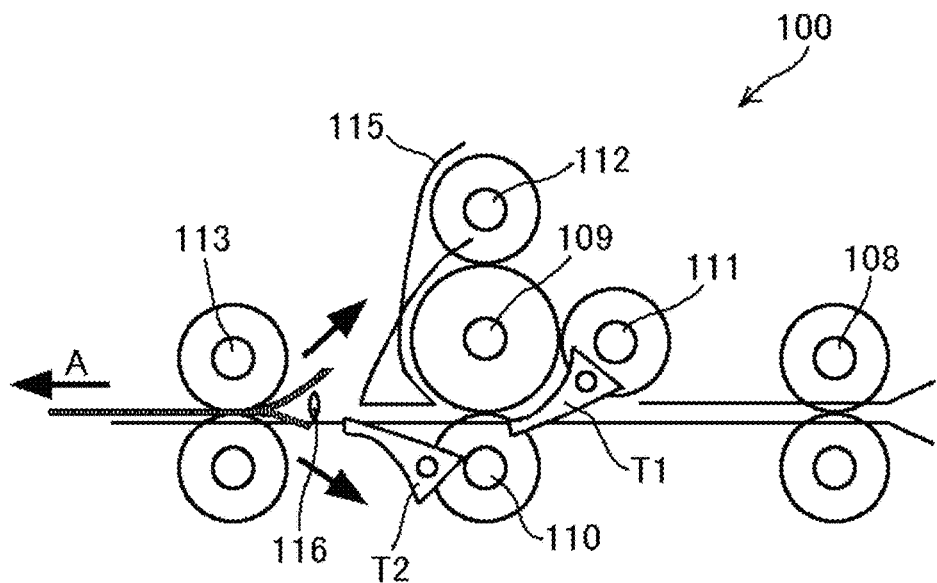
FIG. 10 is another view of the main part of the sheet separation device according to the first embodiment.

As illustrated in FIG. 9, the sheet separation device 100 rotates the exit roller pair 113 to convey the lamination sheet S in the forward conveyance direction (direction A) with the separation claws 116 inserted in the gap g. Then, as illustrated in FIG. 10, when the separation claws 116 reach the rear end of the lamination sheet S in the conveyance direction, the rear end (opening) of the lamination sheet S can be separated.

The separation claws 116 are described further.

Figure 15:
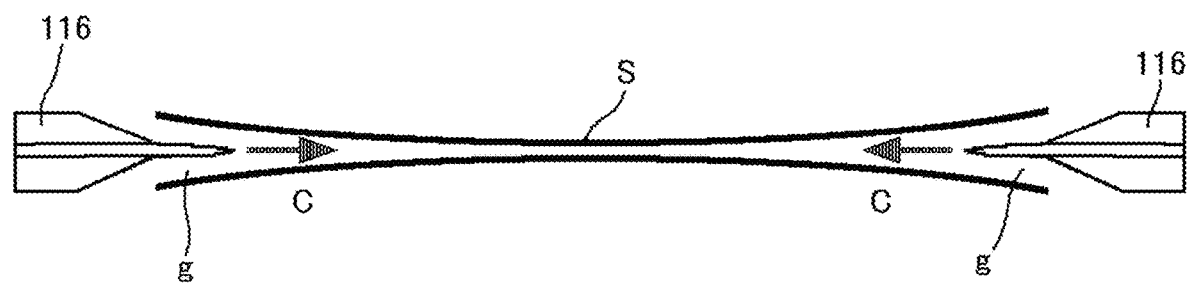
FIG. 15 is a schematic view of a separation claw of the sheet separation device.
Figure 16:
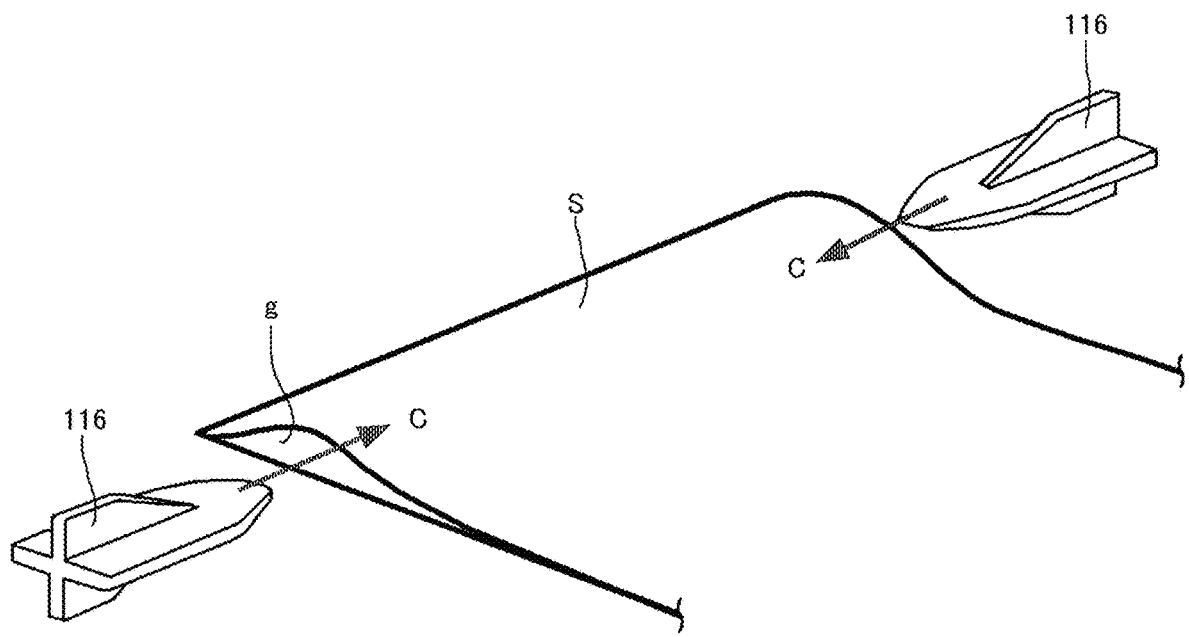
FIG. 16 is a perspective view illustrating how the separation claw separates two sheets of a lamination sheet from each other.
Figure 17:
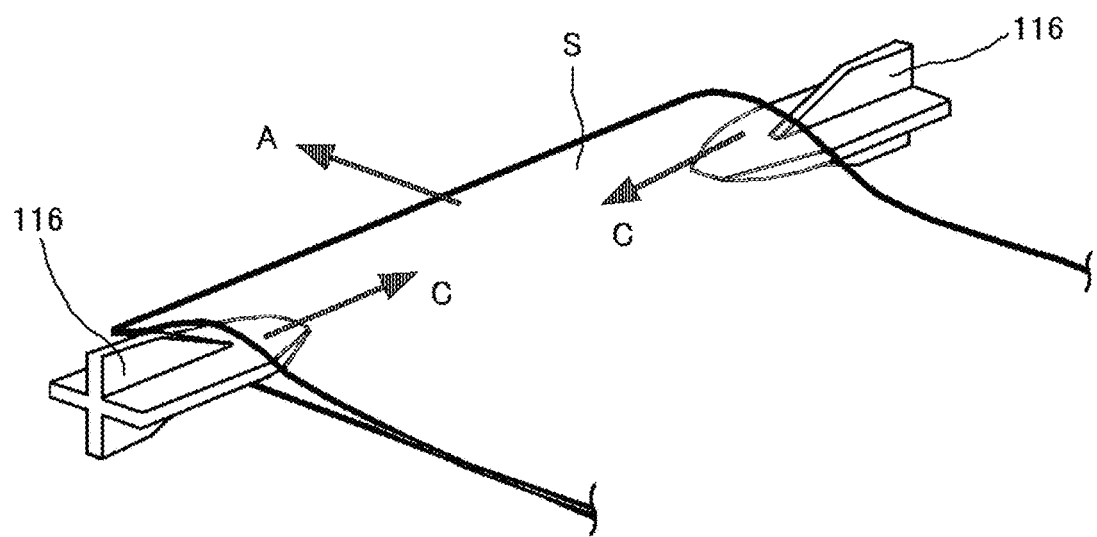
FIG. 17 is another perspective view illustrating how the separation claw separates the two sheets of the lamination sheet from each other.
Figure 18:
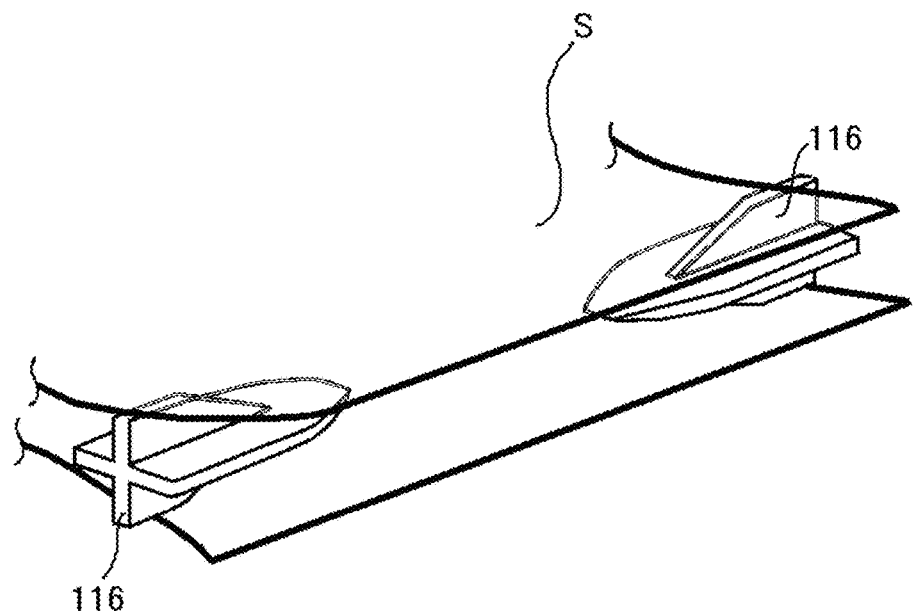
FIG. 18 is another perspective view illustrating how the separation claw separates the two sheets of the lamination sheet from each other.

FIG. 15 is a schematic view of the separation claws in the sheet separation device. FIGS. 16 to 18 are perspective views illustrating how the separation claws separate the overlying sheets in the lamination sheet S from each other.

As illustrated in these drawings, each separation claw 116 has a shape that gradually rises from the front end to the rear end in the insertion direction (indicated by arrow C). Thus, the separation claws 116 can be smoothly inserted into the gap g generated in the lamination sheet S.

Additionally, as the lamination sheet S is conveyed in the forward conveyance direction (indicated by arrow A) after the separation claws 116 are inserted into the gap g (see FIGS. 16 and 17), the lamination sheet S can be reliably separated to the rear end thereof (see FIG. 18).

Alternatively, the sheet separation device 100 can include only a single separation claw 116, and the separation claw 116 can be inserted into only one side of the lamination sheet S. Moreover, the shape of the separation claw 116 is not limited to that illustrated in the drawing. For example, the separation claw 116 can be elliptical or can have a structure capable of rotating by 90 degrees.

Returning to FIG. 10, the description is continued below.

In the sheet separation device 100, after the exit roller pair 113 conveys the lamination sheet S in the forward conveyance direction (direction A) and separates the lamination sheet S, the bifurcating claw T2 moves (rotates) clockwise around the rotation shaft as a fulcrum and closes the conveyance passage along which the lamination sheet S has been conveyed so far.

Figure 11:
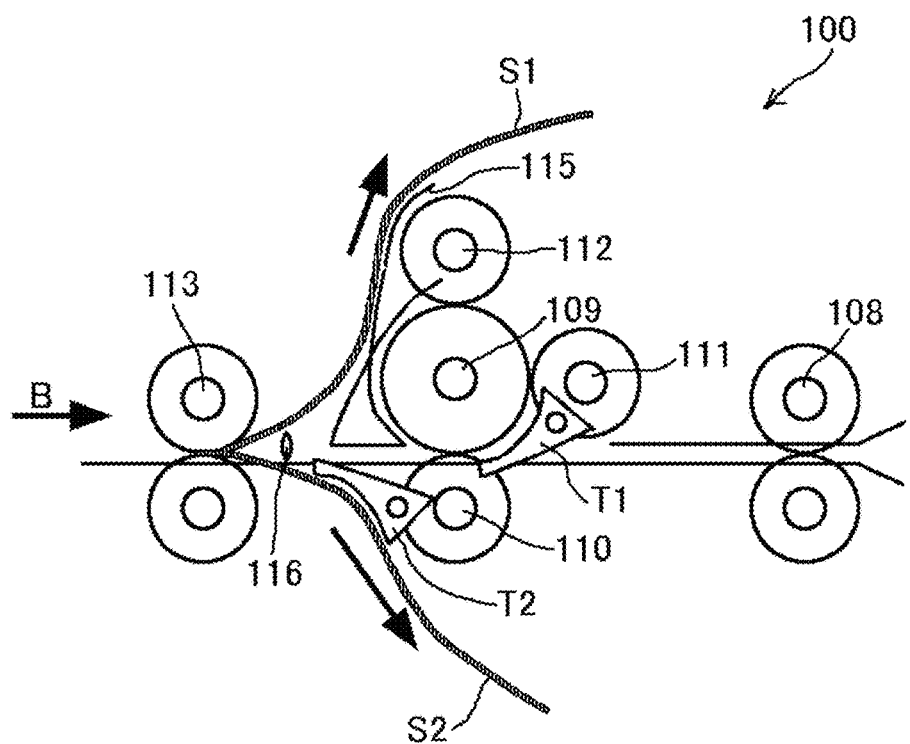
FIG. 11 is another view of the main part of the sheet separation device according to the first embodiment.

Next, as illustrated in FIG. 11, the exit roller pair 113 reverses the rotation, and conveys the lamination sheet S in the backward conveyance direction (direction B). Then, the two separated sheets of the lamination sheet S (hereinafter referred to as an upper sheet 51 and a lower sheet S2) are guided in different directions. That is, the upper sheet 51 is conveyed along the sheet guide 115, and the lower sheet S2 is conveyed along the bifurcating claw T2 that also serves as a sheet guide. As illustrated in the drawing, the lamination sheet S substantially opens with the joined side as one end.

Figure 12:
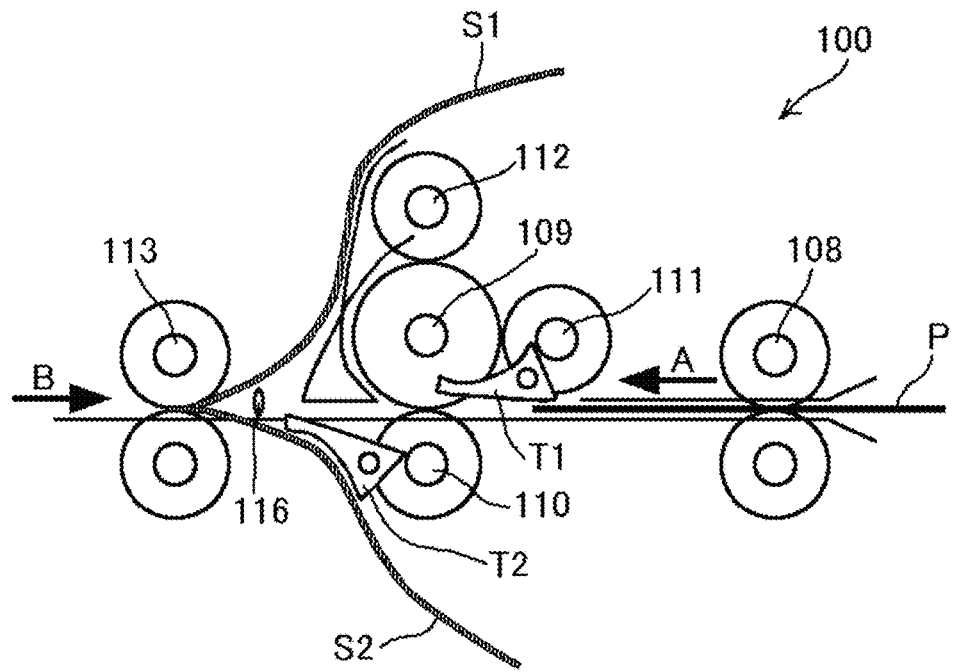
FIG. 12 is another view of the main part of the sheet separation device according to the first embodiment.

Subsequently, as illustrated in FIG. 12, the exit roller pair 113 conveys the lamination sheet S to the designated position in the backward conveyance direction (direction B) and waits. Meanwhile, the entrance roller pair 108 that is an inserter conveys the insertion sheet P from the sheet feeding tray 103 (see FIG. 1) toward the exit roller pair 113 in the forward conveyance direction (direction A). At this time, the bifurcating claw T1 is positioned above the conveyance passage, and the insertion sheet P passes below the bifurcating claw T1.

Figure 13:
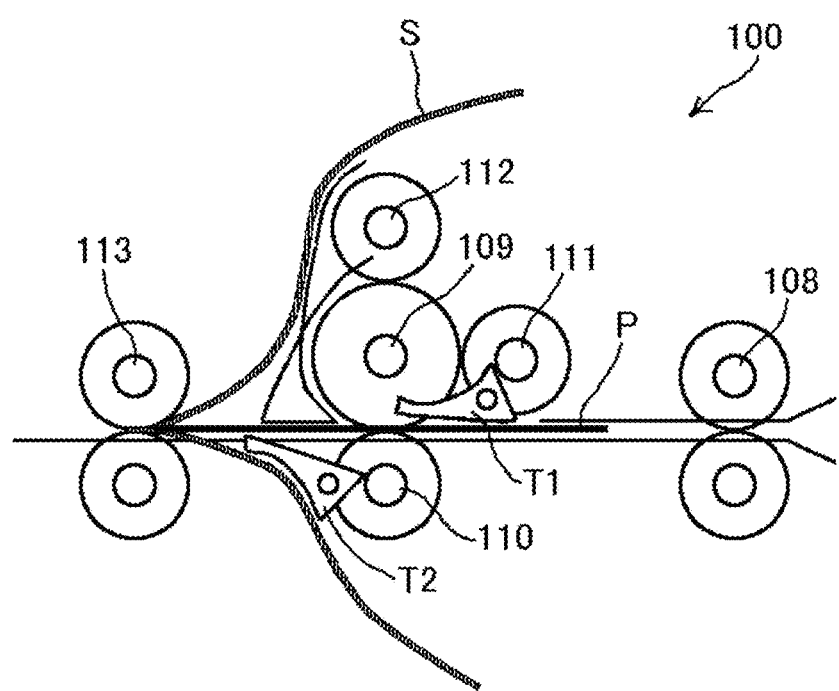
FIG. 13 is another view of the main part of the sheet separation device according to the first embodiment.

Next, as illustrated in FIG. 13, the insertion sheet P is inserted into the opened lamination sheet S. These operations can be triggered by the sheet position detection by the sheet sensor C4 (see FIG. 1).

Figure 14:
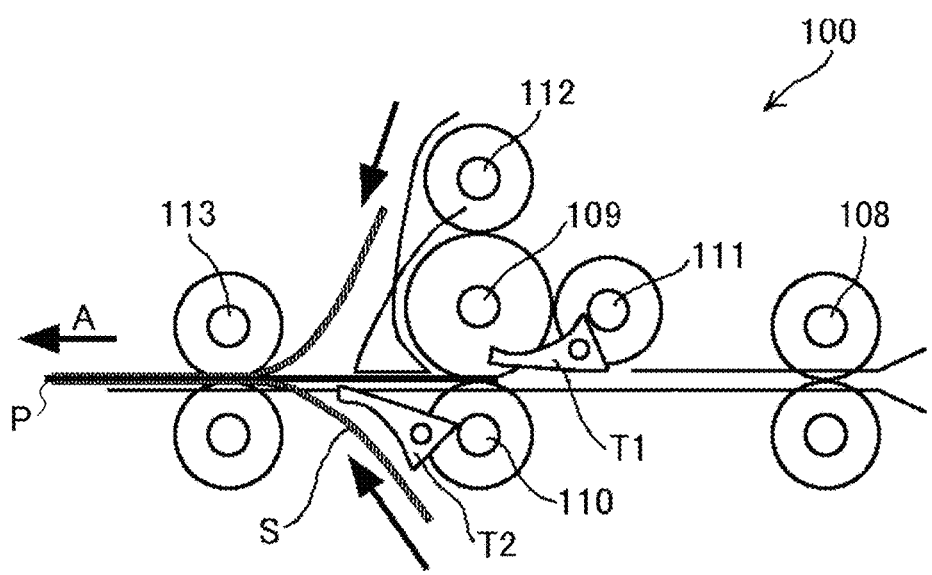
FIG. 14 is another view of the main part of the sheet separation device according to the first embodiment.

As illustrated in FIG. 14, as the exit roller pair 113 conveys the lamination sheet S in which the insertion sheet P is inserted in the forward conveyance direction (direction A), the two sheets are again overlaid one on another, and the opening is closed. Then, the sheet separation device 100 ejects and stacks the lamination sheet S sandwiching the insertion sheet P onto the output tray 104 (FIG. 1) with the exit roller pair 113, or a roller or the like, positioned downstream from the exit roller pair 113.

As described above, the sheet separation device 100 according to the present embodiment can open the lamination sheet S significantly and insert and sandwich the insertion sheet P therein. Therefore, for example, compared with a laminator using a vacuum device, the structure is simple, and the entire apparatus can be simple and compact.

In addition, as illustrated in FIG. 1, the sheet separation device 100 according to the present embodiment can store the lamination sheets S and insertion sheet P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. The insertion sheet P can be stacked on the sheet tray 102 and the lamination sheet S can be stacked on the sheet feeding tray 103.

Descriptions are now given of variations of the present embodiment.

A first variation is described below.

In the above description with reference to FIG. 6, the end of the lamination sheet S can be secured to the winding roller 109 as the lamination sheet S is wound around over the entire circumference or greater of the winding roller 109. By contrast, in the present variation, a description is given of a sheet separation device that can separate sheets of the lamination sheet S by winding the sheets over less than the full circumference of the roller.

Figure 19:
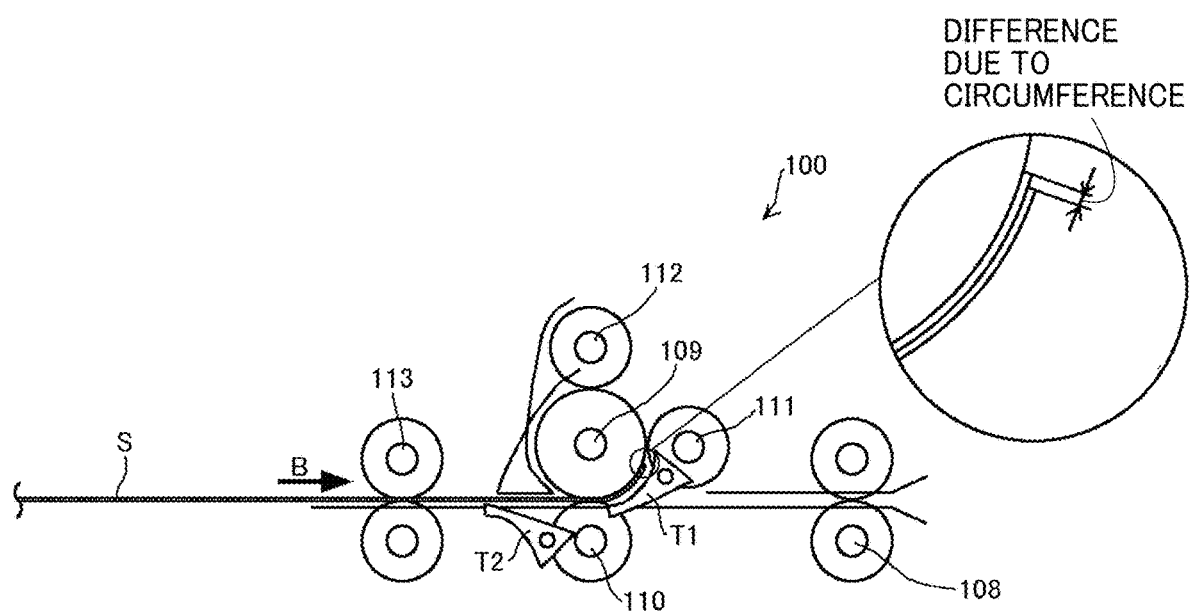
FIG. 19 is a view of a structure illustrated in FIG. 4, together with a partial enlarged view of a lamination sheet on a winding roller illustrated in FIG. 4.
Figure 20:
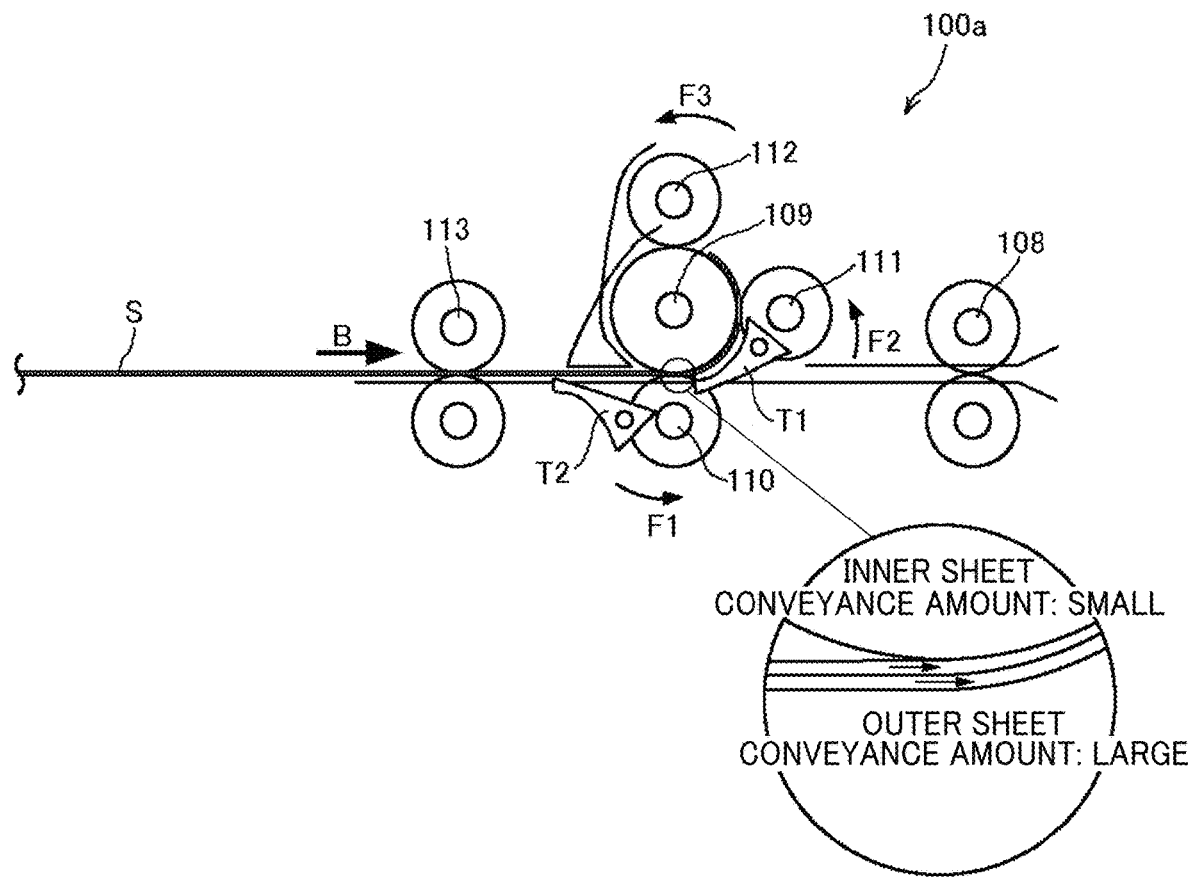
FIG. 20 is a view of a main part of a sheet separation device according to a variation of the first embodiment, together with a partial enlarged view of the lamination sheet on the winding roller.

FIG. 19 is a view of the structure illustrated in FIG. 4, together with a partial enlarged view of the lamination sheet S on the winding roller. FIG. 20 is a view of a main part of a sheet separation device according to the variation of the first embodiment, together with a partial enlarged view of the lamination sheet S on the winding roller.

As illustrated in the partial enlarged view of FIG. 19, when the lamination sheet S is wound around the winding roller 109, a difference is created in the conveyance amount of the lamination sheet S due to the difference in winding circumferential length.

By contrast, as illustrated in FIG. 20, in a sheet separation device 100a according to the present variation, a relation F1<F2<F3 is established where F1 represents the nipping force provided by the driven roller 110, F2 represents the nipping force provided by the grip roller 111, and F3 represents the nipping force provided by the grip roller 112. That is, the nipping forces by the grip rollers 111 and 112 are made larger than the nipping force provided by the driven roller 110, and the displacement between the inner sheet and the outer sheet of the lamination sheet S is regulated in the portions where the grip rollers 111 and 112 press against the driven roller 110.

Therefore, the inner sheet and outer sheet slip past each other by an amount equivalent to the circumferential length difference in the nip between the driven roller 110 and the winding roller 109. Thus, the conveyance amount of the inner sheet of the lamination sheet S is smaller than the conveyance amount of the outer sheet. As a result, even if the lamination sheet S is not wound around the winding roller 109 over the entire circumference or greater, the slack in the inner sheet gathers between the exit roller pair 113 and the winding roller 109, thereby creating the gap (space) g between the inner sheet and the outer sheet.

Thus, owing to the configuration in which the strengths of nipping force provided by the driven roller 110 and the grip rollers 111 and 112 increase in the winding rotation direction of the winding roller 109, the lamination sheet S can be separated by winding the sheets over less than full circumference of the roller. Accordingly, the winding amount of the lamination sheet S can be reduced, and time required for separation can be shortened. Further, it is desirable that the nipping force provided by the driven roller 110 and the grip rollers 111 and 112 can be changed by, for example, adjusting the respective contact forces against the winding roller 109. The sheet separation device 100a is advantageous in that sheets of various sizes can be separated by adjusting the amount of winding of the sheet.

A second variation is described below.

Figure 21:
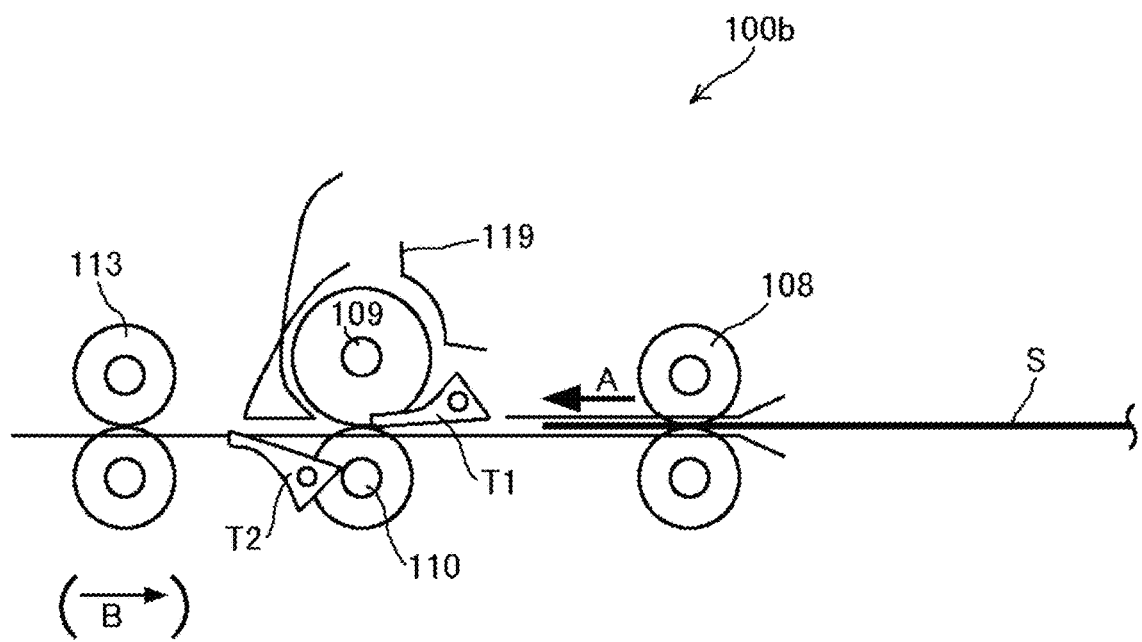
FIG. 21 is a view of a main part of a sheet separation device according to another variation of the first embodiment.

FIG. 21 is a view illustrating a main part of a sheet separation device according to the second variation of the first embodiment. As illustrated in FIG. 21, a sheet separation device 100b according to the present variation includes, instead of the grip rollers 111 and 112, a guide member 119 disposed at a distance from an outer circumferential surface of the winding roller 109. The guide member 119 guides the two-ply lamination sheet S around the circumference of the winding roller 109.

By winding the lamination sheet S around the winding roller 109 with the guide member 119, the lamination sheet S can be separated. Note that both the guide member 119 and the grip rollers 111 and 112 can be provided.

A third variation is described below.

The sheet separation device 100 and the variations thereof can convey the lamination sheet with the bonded side (one side) on the upstream side or downstream side in the conveyance direction. In the embodiment described above, the lamination sheet S is conveyed with the bonded side being the downstream end (leading end) of the lamination sheet S in the forward conveyance direction (direction A). In other words, the unbonded side is positioned at the upstream end (rear end) in direction A.

Alternatively, the lamination sheet S can be conveyed with the unbonded side being the downstream end (leading end) in the forward conveyance direction (direction A). That is, the bonded side can be at the upstream end (rear end) of the lamination sheet S in the forward conveyance direction (direction A). In this case, when the lamination sheet S is wound around the winding roller 109, the rear end in the winding direction, that is, the unbonded ends (one side) of the lamination sheet S separate from each other and deviate from each other by the difference in circumferential length. The lamination sheet S can be separated by pinching such deviated portion with, for example, an electric gripper.

Figure 22:
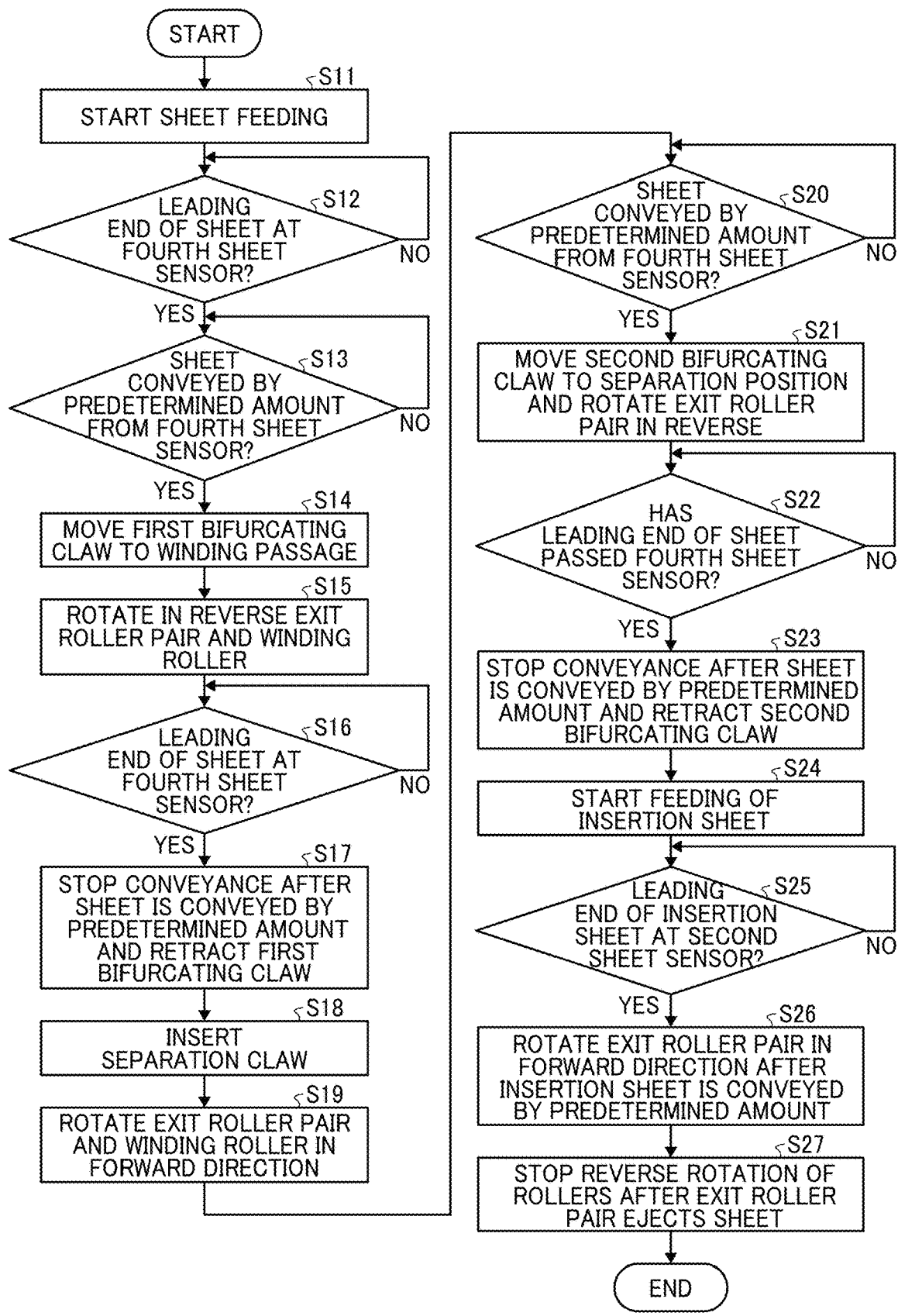
FIG. 22 is a flowchart illustrating a series of operations from sheet feeding to completion of inserting of an insertion sheet.

FIG. 22 is a flowchart illustrating a series of operations from sheet feeding to completion of inserting of the insertion sheet. The series of operations is controlled by the controller 190. The description below proceeds while indicating the reference numerals indicated in the flowchart.

In S11, the sheet separation device 100 starts feeding the lamination sheet S (see FIG. 1). In S12, the sheet separation device 100 determines whether the end of the lamination sheet S has arrived at the sheet sensor C4 as a fourth sensor (see FIG. 2). In S13, in response to a determination that the lamination sheet S has been conveyed by a predetermined amount from the sheet sensor C4 (the fourth sensor), in S14, the sheet separation device 100 moves the bifurcating claw T1 (a first bifurcating claw) to the position to guide the lamination sheet S along the winding passage (see FIG. 3). For example, the predetermined amount is stored in a memory by a manufacturer.

In S15, the sheet separation device 100 rotates the exit roller pair 113 and the winding roller 109 in the reverse direction (the winding rotation direction), thereby winding the lamination sheet S around the winding roller 109 (see FIGS. 4 to 7). In S16, the sheet separation device 100 determines whether the end of the lamination sheet S has arrived at the sheet sensor C4 (the fourth sensor). In S17, the sheet separation device 100 stops conveyance of the lamination sheet S after the lamination sheet S is conveyed from the sheet sensor C4 by a predetermined amount, and retracts the bifurcating claw T1 (the first bifurcating claw) to the original position. In S18, the separation claws 116 are inserted into the gap g generated as the lamination sheet S is separated (see FIG. 8).

In S19, the sheet separation device 100 rotates the exit roller pair 113 and the winding roller 109 in the forward direction, and conveys the lamination sheet S in the forward conveyance direction. As a result, the lamination sheet S is separated (opened) to the rear end in the conveyance direction (see FIGS. 9 and 10).

In response to a determination made in S20 that the lamination sheet S has been conveyed by the predetermined amount from the sheet sensor C4, in S21, the sheet separation device 100 moves the bifurcating claw T2 (a second bifurcating claw) to the separation position and rotates the exit roller pair 113 in the reverse direction. In S22, the sheet separation device 100 determines whether or not the end of the lamination sheet S has passed the sheet sensor C4 (see FIG. 11).

In S23, the sheet separation device 100 stops conveyance of the lamination sheet S after the lamination sheet S is conveyed from the sheet sensor C4 by a predetermined amount, and retracts the bifurcating claw T2 (the second bifurcating claw) to the original position. At this time, the lamination sheet S is opened with the bonded side as one end (see FIG. 11).

In S24, the sheet separation device 100 starts feeding the insertion sheet P (see FIG. 12). In S25, the sheet separation device 100 determines that the end of the insertion sheet P has passed the sheet sensor C3 (a third sheet sensor). Then, in S26, the sheet separation device 100 conveys the insertion sheet P by a predetermined amount, to insert the insertion sheet P into the lamination sheet S (see FIG. 13). Then, the exit roller pair 113 is rotated in the forward direction to convey the lamination sheet S, with the insertion sheet P inserted therein, in the forward conveyance direction. Thus, the inserting completes (see FIG. 14). In S27, after the inserting completes and the lamination sheet S is ejected by the exit roller pair 113, the sheet separation device 100 stops the rotation of all rollers.

Figure 23:
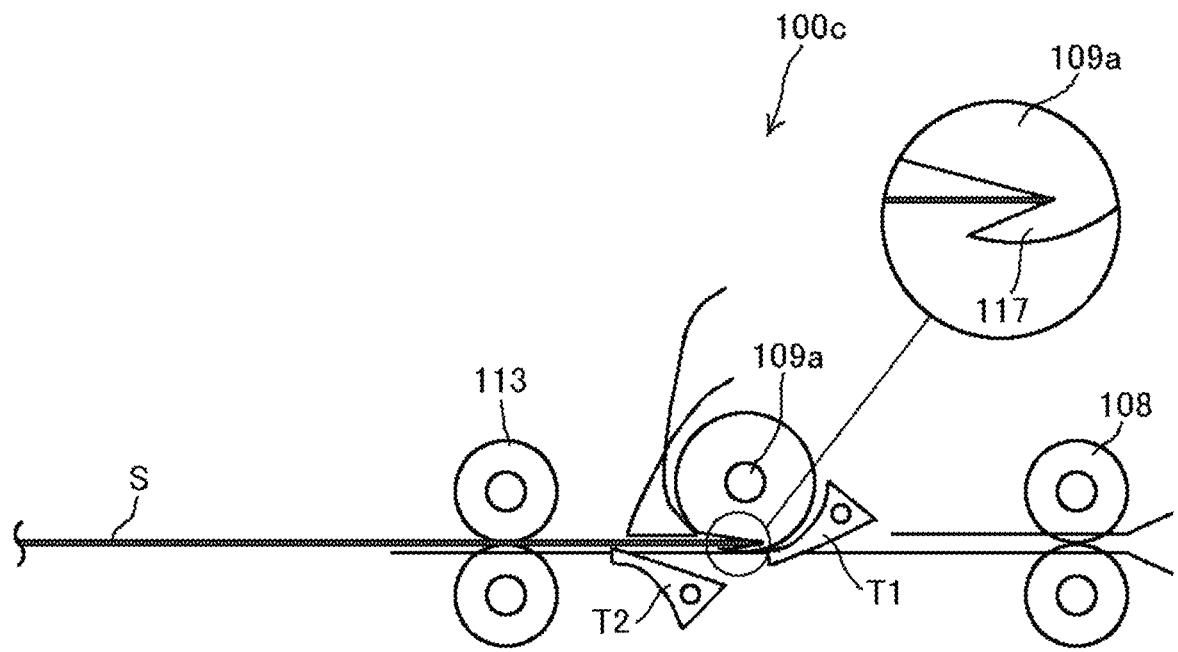
FIG. 23 is a view of a main part of a sheet separation device according to a second embodiment, together with a partial enlarged view of the lamination sheet on the winding roller.

A second embodiment is described below. FIG. 23 is a view of a main part of a sheet separation device according to a second embodiment, together with a partial enlarged view of the lamination sheet on the winding roller. In FIG. 23, elements identical to those illustrated in FIG. 2 are given identical reference numerals, and the descriptions thereof are omitted.

A sheet separation device 100c according to the present embodiment does not include the driven roller 110 and the grip rollers 111 and 112. Instead, the sheet separation device 100c includes a winding roller 109a including a wedge portion 117 as illustrated in the partial enlarged view. The wedge portion 117 is an example of a holder that holds the two-ply lamination sheet S and is molded at the outer periphery of the winding roller 109a.

In the sheet separation device 100c according to the present embodiment, the exit roller pair 113 conveys the lamination sheet S to the winding roller 109a and inserts the end of the lamination sheet S into the wedge portion 117, thereby holding the end of the lamination sheet S.

Figure 24A:
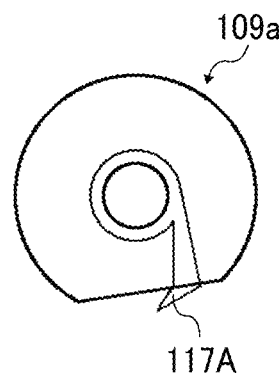
FIG. 24A is a schematic view of a wedge part as a separate component from a winding roller according to the second embodiment.
Figure 24B:
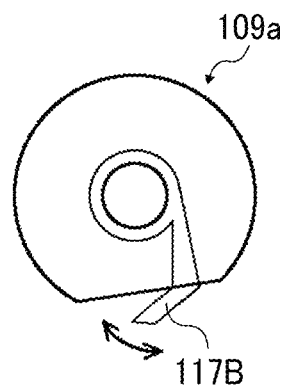
FIG. 24B is a schematic view of a wedge part being an elastic member, according to the second embodiment.

The required function of the wedge portion 117 is securing the lamination sheet S (the end thereof) to the winding roller 109a, and the winding roller 109a can includes a separate wedge portion 117A as illustrated in FIG. 24A. Further, as illustrated in FIG. 24B, the lamination sheet S can be nipped (held) by an elastic member 117B, such as a clip, having an elastic force. Such a structure can be selected according to the configuration of the sheet separation device.

Figure 25:
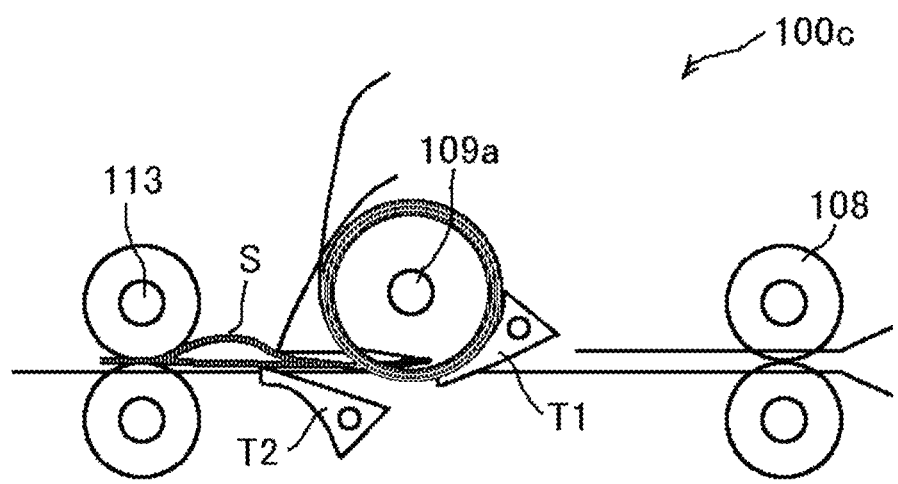
FIG. 25 is another view of the main part of the sheet separation device according to the second embodiment.

In the sheet separation device 100c of this embodiment, the operation up to the point where the lamination sheet S is conveyed to the winding roller 109a and the operation after the lamination sheet S is held on the winding roller 109a are the same as those in the first embodiment described above. As illustrated in FIG. 25, by winding the lamination sheet S around the winding roller 109a, a difference in winding circumferential length is created between the inner and outer sheets of the lamination sheet S, and the lamination sheet S can be separated.

Since the sheet separation device 100c of this embodiment does not use the driven roller 110 and the grip rollers 111 and 112, adjustment of the conveyance force thereof is not necessary. In addition, compared with the first embodiment, the configuration is simpler, and the entire apparatus can be further simplified and downsized.

Next, descriptions are given of a laminator, an image forming apparatus, and an image forming system including a sheet separation device according to the present disclosure.

Figure 26:
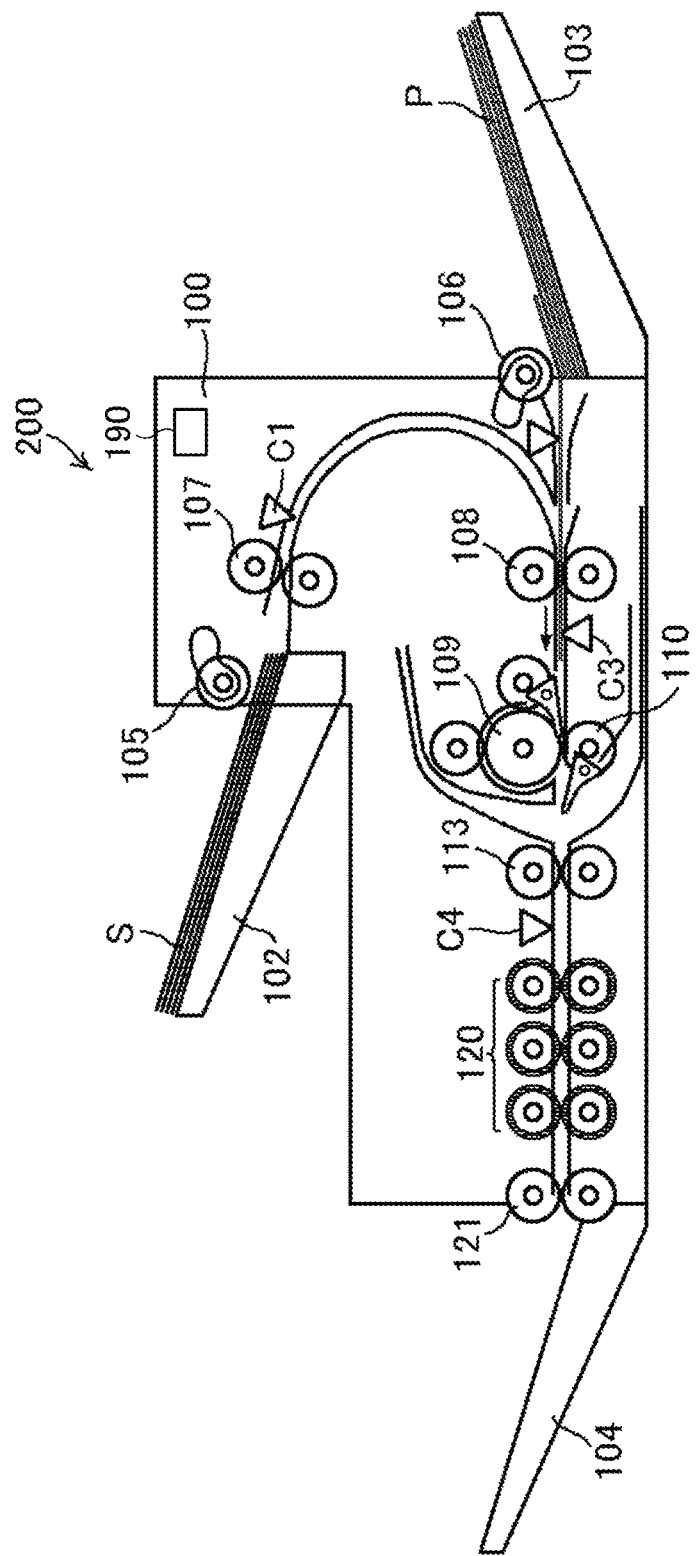
FIG. 26 is a view illustrating an example of general arrangement of a laminator including a sheet separation device according to one embodiment.

FIG. 26 is a view illustrating an example of general arrangement of the laminator including the sheet separation device according one embodiment of the present disclosure.

As illustrated in FIG. 26, a laminator 200 includes the sheet separation device 100 described above, pressure heating rollers 120 (heat and pressure members) to heat and press the lamination sheet S, and an ejection roller pair 121 disposed downstream from the pressure heating roller 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 27:
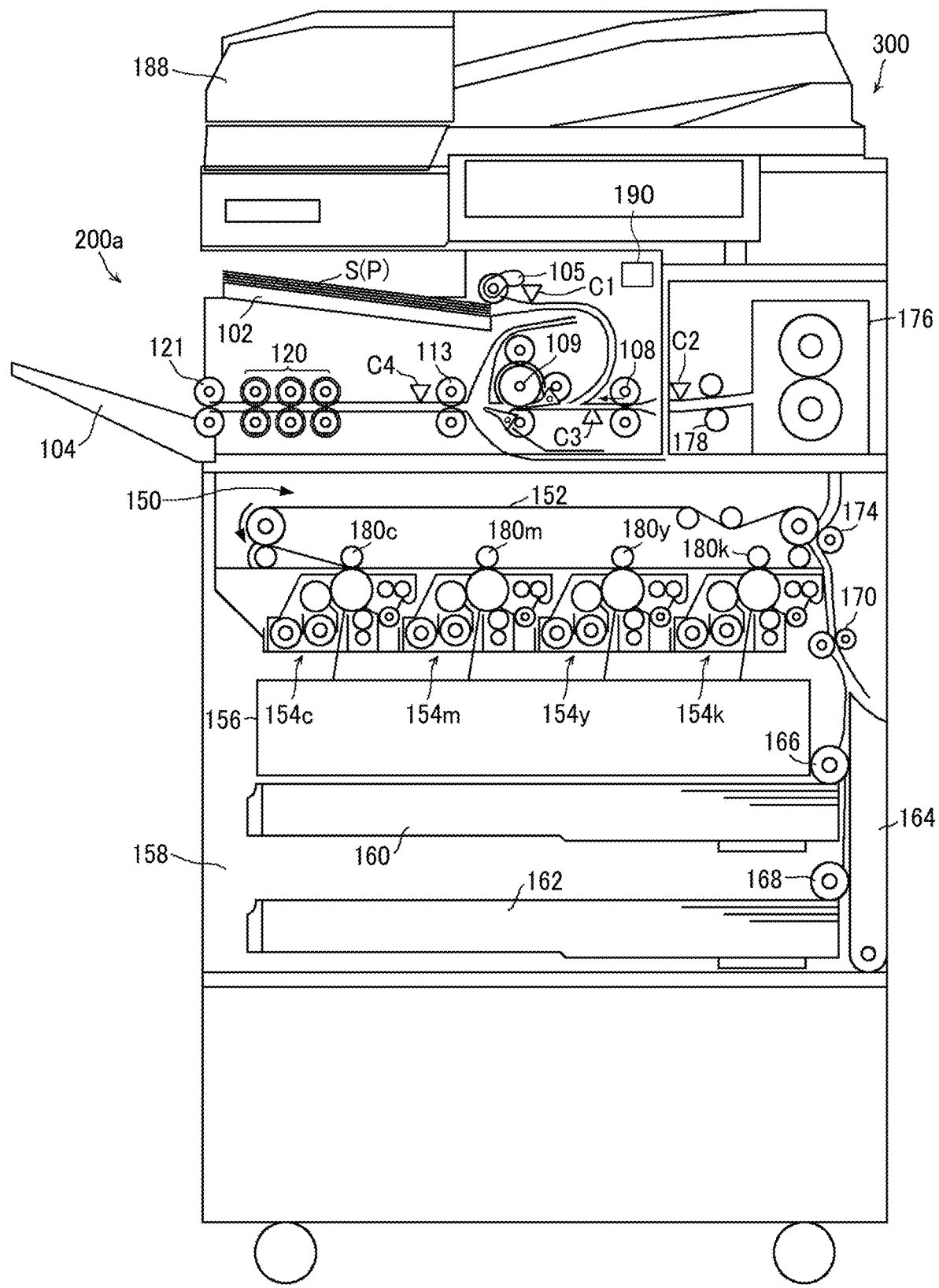
FIG. 27 is a view illustrating an example of general arrangement of an image forming apparatus including the laminator according to one embodiment.

FIG. 27 is a view illustrating an example of general arrangement of an image forming apparatus including the laminator according to one embodiment of the present disclosure. An image forming apparatus 300 illustrated in FIG. 27 includes a laminator 200a to perform a laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The configuration of the image forming apparatus 300 is described in detail. As illustrated in FIG. 27, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Image forming devices 154c, 154m, 154y, and 154k are arranged side by side along and below the intermediate transfer belt 152 of the intermediate transfer device 150, in that order in a direction in which the intermediate transfer belt 152 is rotated. The image forming devices 154c, 154m, 154y, and 154k form toner images of cyan, magenta, yellow, and black, respectively. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a two-ply sheet tray on which two-ply sheets are stacked, and the second sheet feeding tray 162 is an example of a medium tray on which sheet-like media are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a two-ply sheet feeder that feeds a two-ply sheet from the first sheet feeding tray 160 (the two-ply sheet tray). The second sheet feeding roller 168, the conveyance roller 170, and the sheet feeding passage 164 are examples of a medium feeder that feeds a sheet medium from the second sheet feeding tray 162 (the medium tray). The image forming devices 154, the intermediate transfer device 150, the fixing device 176, and the like are examples of an image forming device that forms an image on a two-ply sheet or a sheet medium.

Next, a description is given of an operation of forming an image on the lamination sheet S and then performing lamination in the image forming apparatus 300 according to the present embodiment.

To form an image on the lamination sheet S, first, an image reading device 188 reads a document image, and the exposure device 156 performs image writing. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the insertion sheet P to the sheet feeding passage 164, and the sheet ejection device 178 sends the insertion sheet P to the laminator 200a.

In this way, the lamination sheet S on which the image has been formed and the insertion sheet P are sent to the laminator 200a, and a laminating process is performed. The details of the laminating process have been described above and redundant descriptions are omitted.

With the above-described configuration, the image forming apparatus 300 according to the present embodiment can perform the laminating process with the laminator 200a after image formation on the insertion sheet P. In addition, the image forming apparatus 300 can perform the laminating process after image formation on both the insertion sheet P and the lamination sheet S. The image forming apparatus 300 can include another image forming device that forms an image on an insertion sheet (a sheet medium) in addition to the image forming device that forms an image on a lamination sheet (a two-ply sheet). Alternatively, the image forming device can be common to the two-ply sheet and the insertion sheet, and the conveyance passage can be configured to convey the two-ply sheet and the insertion sheet to the common image forming device.

Figure 28:
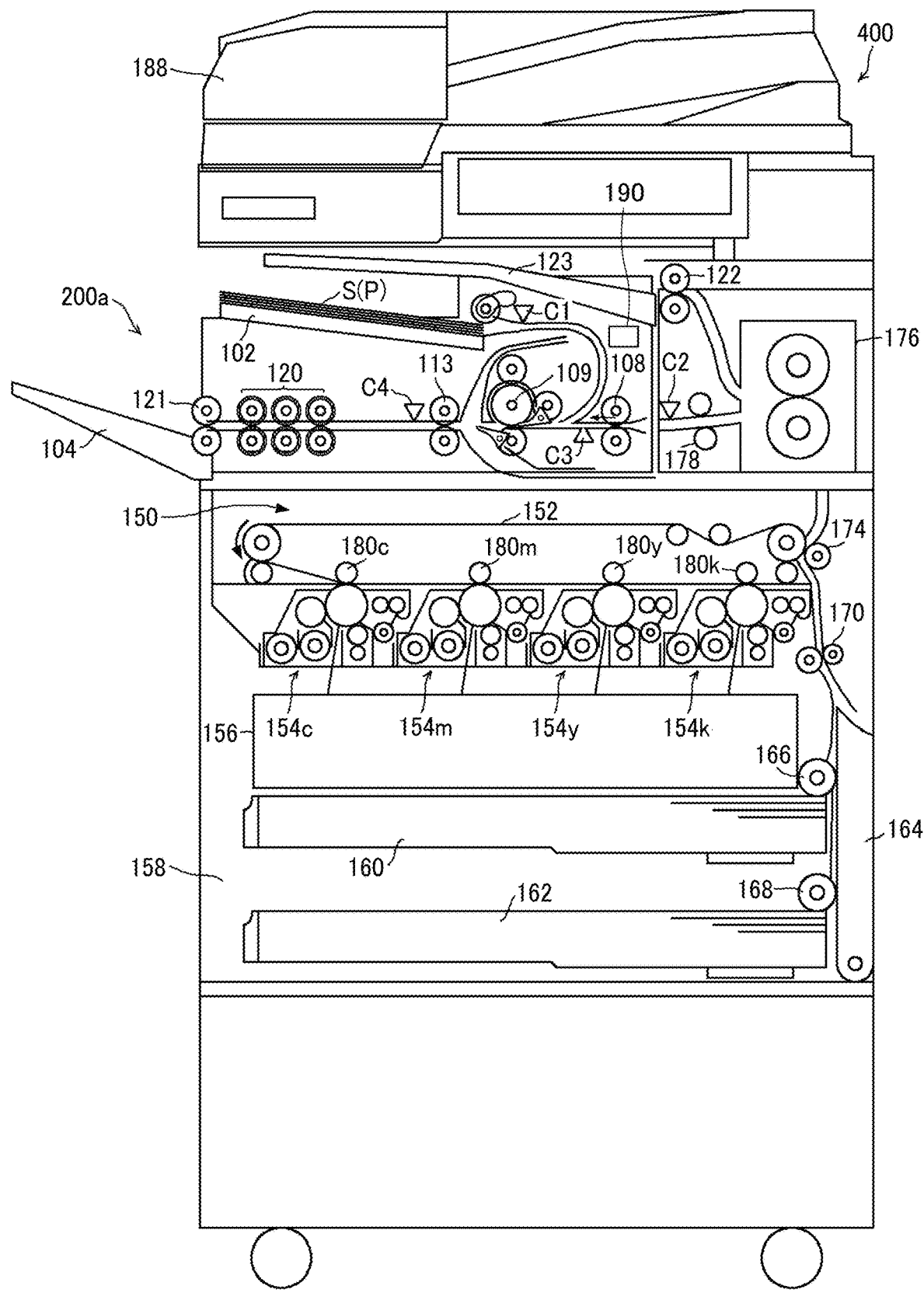
FIG. 28 is a view illustrating general arrangement of an image forming apparatus including the laminator according to a variation.

FIG. 28 is a view illustrating general arrangement of a variation of the image forming apparatus including the laminator according to one embodiment of the present disclosure. Differently from the image forming apparatus 300 illustrated in FIG. 27, the main body of the image forming apparatus 400 includes an ejection roller 122 and an output tray 123.

When the laminating process is not performed, the image forming apparatus 400 can eject the recording medium on which the image is formed using the ejection roller 122 of the main body to the output tray 123 of the main body. Therefore, the image forming apparatus 400 does not decrease the image output speed when the laminating process is not performed.

The laminator 200a can be removably installed inside the image forming apparatus 400. That is, when the laminating process is unnecessary, the laminator 200a can be removed from the image forming apparatus 400.

In addition, the laminator 200a can adapt to the following configuration. The sheet feeding tray 103 on which the insertion sheets P are stacked and the pickup roller 106 to feed the insertion sheets P from the sheet feeding tray 103 are mounted in the removed laminator 200a, so that the laminator 200a is used as a stand-alone machine similar to that illustrated in FIG. 26.

The image forming apparatus 300 illustrated in FIG. 27 and the image forming apparatus 400 illustrated in FIG. 28 can include a sheet separation device instead of the laminator. The image forming apparatus 400 illustrated in FIG. 28 can include a sheet separation device that is removably mounted.

Further, aspects of this disclosure can be embodied as an image forming system that includes an image forming apparatus and the sheet separation device 100, 100a, or 100b, or the laminator 200 detachably coupled to the image forming apparatus. Furthermore, aspects of this disclosure can be embodied as a system including at least one of a sheet feeder (a stacker) and a case binding device. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, screen printing, or other printing method can be used.

The embodiments of the present disclosure has been described in detail above. The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A sheet separation device configured to separate a two-ply sheet in which two sheets are bonded together at a portion of the two-ply sheet, the sheet separation device comprising:
a rotator including a holder configured to hold the two-ply sheet; and
a conveyor configured to convey the two-ply sheet to the holder, with a bonded portion of the two-ply sheet being an upstream end or a downstream end of the two-ply sheet in a conveyance direction of the two-ply sheet,
the holder configured to wind the two-ply sheet around the rotator as the rotator rotates, to create a difference in winding circumferential length between the two sheets and separate the two sheets.

2. The sheet separation device according to claim 1, wherein the conveyor is configured to convey the two-ply sheet in both a direction toward the rotator and a reverse direction retracting from the rotator.

3. The sheet separation device according to claim 2, wherein, in winding the two-ply sheet around the rotator, the rotator winds the two-ply sheet with the bonded portion of the two-ply sheet being the upstream end in the conveyance direction in which the conveyor conveys the two-ply sheet toward the rotator.

4. The sheet separation device according to claim 3, further comprising:
a separation claw disposed between the rotator and the conveyor in the conveyance direction and configured to move in a width direction of the two-ply sheet; and
control circuitry configured to:
insert, in the width direction, the separation claw into a space between the two sheets of the two-ply sheet; and
cause the conveyor to convey the two-ply sheet in the reverse direction retracting from the rotator with the separation claw inserted in the space, to separate the two sheets of the two-ply sheet.

5. The sheet separation device according to claim 4, further comprising a sheet guide configured to guide the separated two sheets of the two-ply sheet to different passages,
wherein the conveyor is configured to convey the separated two sheets to the sheet guide, to open the two-ply sheet.

6. The sheet separation device according to claim 5, further comprising:
a first stacking tray configured to store the two-ply sheet;
a first feeder configured to feed the two-ply sheet from the first stacking tray to the conveyor;
a second stacking tray configured to store a sheet medium to be inserted into the two-ply sheet; and
a second feeder configured to feed, from the second stacking tray, the sheet medium into the two-ply sheet.

7. A laminator comprising:
the sheet separation device according to claim 1; and
a heat and pressure member configured to heat and press together the two sheets of the two-ply sheet.

8. An image forming apparatus comprising:
a two-ply sheet tray configured to store the two-ply sheet;
a two-ply sheet feeder configured to feed the two-ply sheet from the two-ply sheet tray;
an image forming device configured to form an image on the two-ply sheet; and
the sheet separation device according to claim 1, to separate the two sheets of the two-ply sheet.

9. The image forming apparatus according to claim 8, further comprising a heat and pressure member configured to heat and press the two-ply sheet,
wherein the sheet separation device and the heat and pressure member comprise a laminator.

10. The image forming apparatus according to claim 8, further comprising:
a medium tray configured to store a sheet medium;
a medium feeder configured to feed the sheet medium from the medium tray;
an image forming device configured to form an image on the sheet medium; and
an inserter configured to insert the sheet medium on which the image is formed into the two-ply sheet.

11. An image forming apparatus comprising:
a medium tray configured to store a sheet medium;
a medium feeder configured to feed the sheet medium from the medium tray;
an image forming device configured to form an image on the sheet medium;
the sheet separation device according to claim 1; and
an inserter configured to insert the sheet medium into the two-ply sheet.

12. The image forming apparatus according to claim 11, further comprising a heat and pressure member configured to heat and press the two-ply sheet,
wherein the sheet separation device and the heat and pressure member comprise a laminator.

13. An image forming system comprising:
an image forming apparatus; and
the sheet separation device according to claim 1, removably coupled to the image forming apparatus.

14. The image forming system according to claim 13, further comprising a heat and pressure member configured to heat and press the two-ply sheet,
wherein the sheet separation device and the heat and pressure member comprise a laminator.

15. A sheet separation device configured to separate a two-ply sheet in which two sheets are bonded together at a portion of the two-ply sheet, the sheet separation device comprising:
a rotator;
a nipping member disposed opposite the rotator and configured to nip the two-ply sheet with the rotator;
a conveyor configured to convey the two-ply sheet between the rotator and the nipping member with a bonded portion of the two-ply sheet being an upstream end or a downstream end of the two-ply sheet in a conveyance direction of the two-ply sheet; and
a winding member disposed adjacent to the rotator and configured to wind the two-ply sheet around the rotator, to create a difference in winding circumferential length between the two sheets and separate the two sheets.

16. The sheet separation device according to claim 15, wherein the nipping member is a first nipping member, and the winding member includes at least one second nipping member configured to nip the two-ply sheet with the rotator, and
wherein the at least one second nipping member is disposed around a circumference of the rotator and downstream from the first nipping member in a winding direction in which the rotator rotates to wind the two-ply sheet.

17. The sheet separation device according to claim 16, wherein a nipping force to nip the two-ply sheet between the rotator and the at least one second nipping member is greater than a nipping force to nip the two-ply sheet between the rotator and the first nipping member.

18. The sheet separation device according to claim 16, wherein the winding member includes a plurality of second nipping members around the circumference of the rotator, and wherein a nipping force to nip the two-ply sheet between the rotator and each of the plurality of second nipping members increases in the winding direction in which the rotator rotates to wind the two-ply sheet.

19. The sheet separation device according to claim 15, wherein the winding member includes a guide member at a distance from an outer circumferential surface of the rotator in a direction orthogonal to a rotation axis of the rotator, and wherein the guide member is configured to guide the two-ply sheet along the outer circumferential surface of the rotator.

\* \* \* \* \*